June 26, 1951  G. VANDERMARK  2,558,470
CONVERTIBLE SEAT AND BED FOR TRUCK CABS

Filed Feb. 23, 1950  2 Sheets-Sheet 1

George Vandermark
*INVENTOR.*

June 26, 1951   G. VANDERMARK   2,558,470
CONVERTIBLE SEAT AND BED FOR TRUCK CABS
Filed Feb. 23, 1950   2 Sheets-Sheet 2

George Vandermark
INVENTOR.

BY *Clarence A. O'Brien*
*and Harvey B. Jackson*
Attorneys

Patented June 26, 1951

2,558,470

UNITED STATES PATENT OFFICE 2,558,470

CONVERTIBLE SEAT AND BED FOR TRUCK CABS

George Vandermark, Detroit, Mich.

Application February 23, 1950, Serial No. 145,825

2 Claims. (Cl. 296—63)

The present invention relates to new and useful improvements in cabs for tractor trucks and more particularly to a convertible seat and bed positioned in the cab to provide sleeping accommodations for the driver of the cab.

An important object of the invention is to provide a foldable bed frame having removable cushions which form a passenger or helper's seat alongside the driver's seat when the bed is folded.

Another object of the invention is to provide novel means for hanging one of the bed cushions on the rear wall of the cab to provide an adjustable back for the seat.

A still further object of the invention is to construct the cab with a compartment extending from the interior of the cab under the hood for the engine and positioned to accommodate the feet of a person occupying the bed.

A still further object is to provide a device of this character of simple and practical construction, which is comfortable and durable when used either as a bed or a seat, which may be installed in position in the cab with slight changes in construction thereof and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
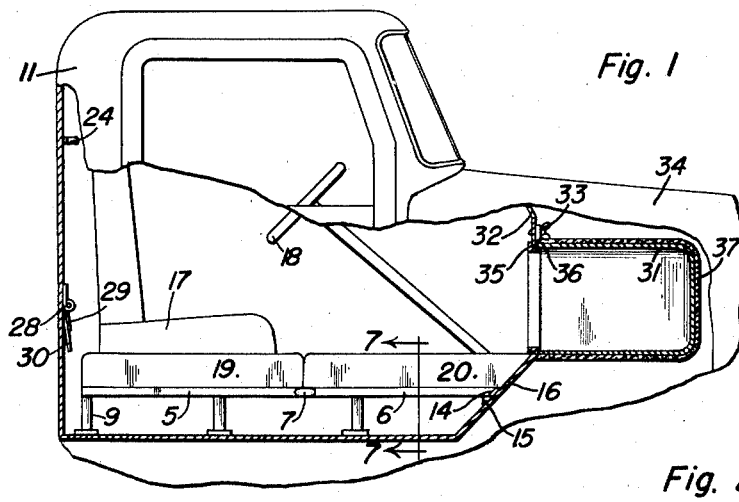
Figure 1 is a fragmentary side elevational view of a truck cab with parts broken away and shown in section and showing the bed in open position.
Figure 2:
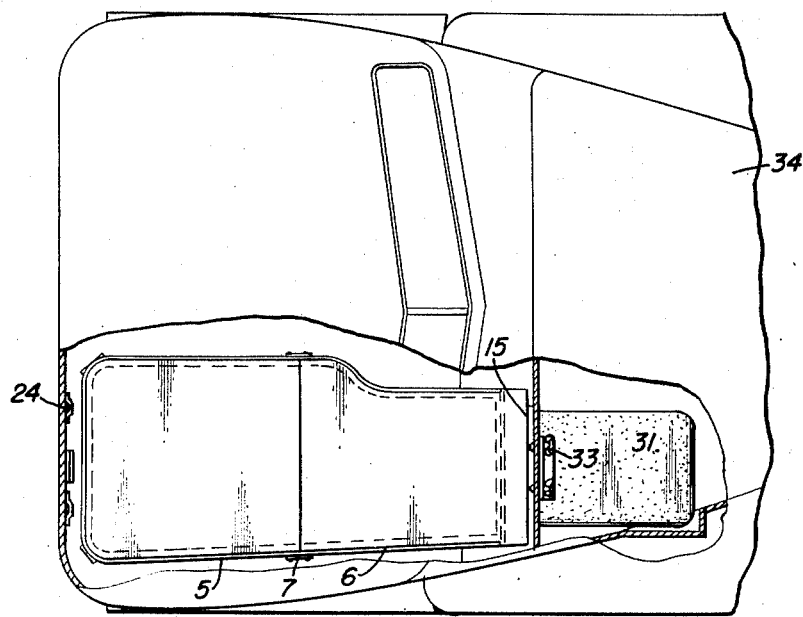
Figure 2 is a top plan view with parts broken away and shown in section.
Figure 3:
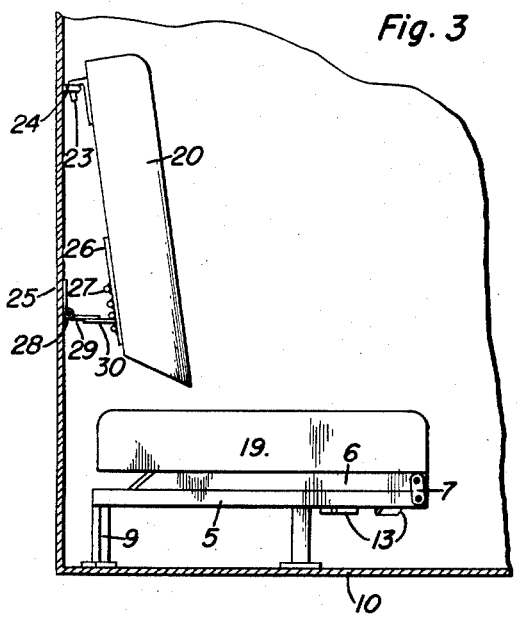
Figure 3 is a side elevational view showing the bed folded to form a seat in the cab.
Figure 4:
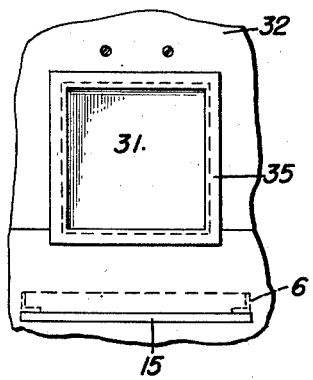
Figure 4 is a view in elevation of the dash or fire wall of the cab showing the foot compartment.
Figure 5:
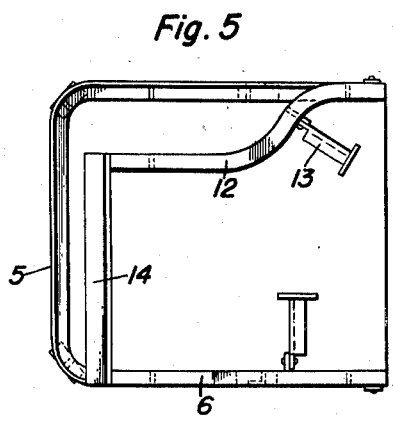
Figure 5 is a top plan view of the bed frame shown in folded position.
Figure 6:
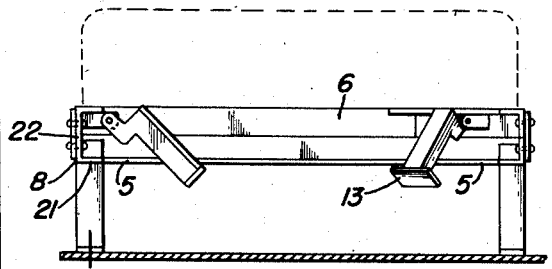
Figure 6 is a front elevational view thereof.
Figure 7:
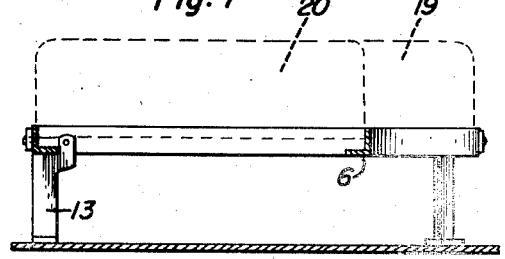
Figure 7 is a sectional view taken on the line 7—7 of Figure 1.
Figure 8:
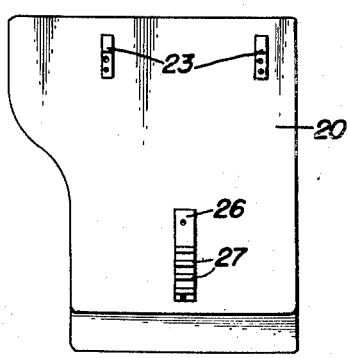
Figure 8 is a rear elevational view of the back of the seat.

Referring now to the drawings in detail wherein for the purpose of illustration I have disclosed a preferred embodiment of this invention, the numeral 5 designates a rear fixed bed frame and 6 is a front bed frame connected at its rear edge to the front edge of the rear frame 5 by hinge straps 7 for swinging the front frame 6 into a folded position on top of the rear frame 5, as shown in Figure 3 of the drawings.

The rear bed frame 5 is formed of angle iron members 8 supported on legs 9 suitably secured to the floor 10 of a tractor truck cab 11, or any other type of truck cab and the front foldable bed frame 6 is also constructed of angle members 12 provided adjacent the rear edge of frame 6 with foldable legs 13 and formed with a sloping front edge 14 for resting on a foot rail 15 secured to the sloping floor board 16 at the front portion of the cab.

The bed frames 5 and 6 are positioned at the right hand side of the cab out of the way of the driver's seat 17 and steering wheel 18.

Cushions 19 and 20 are supported on the horizontal flanges 21 of the bed frame members 8 and 12 inwardly of the vertical flanges 22 thereof to prevent sliding of the cushions on the frame.

Cushions 19 and 20 are removable and the back of cushion 20 is provided with a pair of hooks 23 adjacent one end for engaging hanger brackets 24 secured to the upper portion of the rear wall 25 of the cab to form a back rest or back of a seat when bed frame 6 is folded on top of bed frame 5 and cushion 19 placed on top of the folded frame to thus convert the bed into a seat alongside of the driver's seat 17.

The hooks 23 and brackets 24 swingably support the upper edge of cushion 20 and a plate 26 is suitably secured to the back of cushion 20 adjacent its lower edge and to which a plurality of horizontal bars 27 are welded or otherwise suitably secured in vertically spaced apart relation one with respect to the other. A conventional type of hinge structure 28 is secured to the back 25 of the cab and includes a swinging hinge plate 29 to which a dog 30 is welded or otherwise suitably secured for selective engagement with the rods 27 to hold cushion 20 in an adjustably inclined position.

Front bed frame 6 and cushion 20 are constructed of reduced width at their front ends to prevent interference with the gear shift lever and hand brake lever (not shown) of the cab and a foot compartment 31 is provided at its upper edge with a hinge 36 and which in turn is removably attached to the dash or fire wall 32 at the front of the cab by bolts and wing bolts 33 to support the compartment in front of the bed and projecting forward under the hood 34 of the cab. The hinge 36 enables the compartment to swing upwardly to afford access to adjacent parts of the engine. The opening in the fire wall for the compartment is provided with a sponge rubber sealing strip 35 and compartment 31 is provided with an asbestos covering 37.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination, a truck cab including a partition separating the cab from an engine compartment, a foldable bed in the cab and including a rear fixed bed frame and a front foldable bed frame connected to the fixed frame for swinging into and out of position on top of the fixed frame, removable cushions on the frames, hangers on the rear wall of the cab for one of said cushions to support the same vertically behind the fixed bed frame to form a seat back for a person seated on the folded bed frames, and a compartment supported in the first-named compartment at the front side of the partition and having an entrance at the foot of the bed to receive the feet of a person lying on the bed when the latter is open.

2. The combination according to claim 1 wherein a sealing strip is provided between said partition and the entrance to said second-named compartment to prevent fumes from said first-named compartment from entering the second-named compartment.

GEORGE VANDERMARK.

REFERENCES CITED

The following references are of record in the file of this patent:

UNITED STATES PATENTS

| Number | Name | Date |
|---|---|---|
| Re. 13,805 | Edmondson | Oct. 6, 1914 |
| Re. 22,062 | Kounkel | Apr. 7, 1942 |
| 1,465,925 | Steel | Aug. 21, 1923 |
| 1,577,232 | Holly | Mar. 16, 1926 |
| 1,894,103 | Kuenzel | Jan. 10, 1933 |